United States Patent
Zhang et al.

(10) Patent No.: US 11,676,610 B2
(45) Date of Patent: Jun. 13, 2023

(54) ACOUSTIC SIGNATURES FOR VOICE-ENABLED COMPUTER SYSTEMS

(71) Applicant: Visa International Service Association, San Francisco, CA (US)

(72) Inventors: Yangyong Zhang, Foster, CA (US); Mastooreh Salajegheh, Foster, CA (US); Maliheh Shirvanian, Cupertino, CA (US); Sunpreet Singh Arora, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/742,289

(22) Filed: May 11, 2022

(65) Prior Publication Data
US 2022/0270618 A1 Aug. 25, 2022

Related U.S. Application Data

(63) Continuation of application No. 16/723,887, filed on Dec. 20, 2019, now Pat. No. 11,355,128.

(51) Int. Cl.
*G10L 17/24* (2013.01)
*G10L 15/22* (2006.01)
*G10L 15/30* (2013.01)

(52) U.S. Cl.
CPC .............. *G10L 17/24* (2013.01); *G10L 15/22* (2013.01); *G10L 15/30* (2013.01); *G10L 2015/223* (2013.01)

(58) Field of Classification Search
USPC ..................................... 704/275, 270, 1–504
See application file for complete search history.

(56) References Cited

U.S. PATENT DOCUMENTS

| | | | | |
|---|---|---|---|---|
| 7,533,735 B2* | 5/2009 | Gantman | .................. | H04L 9/32 726/26 |
| 10,022,614 B1* | 7/2018 | Tran | ........................ | G16H 50/20 |
| 10,325,596 B1* | 6/2019 | Tran | ........................ | G10L 15/30 |
| 10,871,943 B1* | 12/2020 | D'Amato | ................ | G06F 3/162 |
| 10,887,764 B1* | 1/2021 | Mokady | ................ | H04L 9/0643 |
| 11,355,128 B2* | 6/2022 | Zhang | .................... | G06F 21/32 |

(Continued)

FOREIGN PATENT DOCUMENTS

WO 2015163774 A1 10/2015

OTHER PUBLICATIONS

U.S. Appl. No. 16/723,887, Non-Final Office Action, dated Sep. 27, 2021, 16 pages.

(Continued)

*Primary Examiner* — Marcus T Riley
(74) *Attorney, Agent, or Firm* — Kilpatrick Townsend & Stockton LLP

(57) ABSTRACT

Acoustic signatures can be used in connection with a voice-enabled computer system. An acoustic signature can be a specific noise pattern (or other sound) that is played while the user is speaking and that is mixed in the acoustic channel with the user's speech. The microphone of the voice-enabled computer system can capture, as recorded audio, a mix of the acoustic signature and the user's voice. The voice-enabled computer system can analyze the recorded audio (locally or at a backend server) to verify that the expected acoustic signature is present and/or that no previous acoustic signature is present.

20 Claims, 10 Drawing Sheets

(56) References Cited

U.S. PATENT DOCUMENTS

| | | | | |
|---|---|---|---|---|
| 2005/0240779 | A1* | 10/2005 | Aull | H04L 9/32 |
| | | | | 713/186 |
| 2014/0359736 | A1* | 12/2014 | Harty | H04L 63/0861 |
| | | | | 726/7 |
| 2018/0133583 | A1* | 5/2018 | Tran | A42B 3/30 |
| 2019/0311722 | A1* | 10/2019 | Caldwell | G10L 17/24 |
| 2019/0362716 | A1* | 11/2019 | Tran | G10L 15/22 |
| 2021/0118439 | A1* | 4/2021 | Schillmoeller | G10L 15/26 |
| 2021/0193154 | A1* | 6/2021 | Zhang | G10L 15/30 |
| 2022/0148592 | A1* | 5/2022 | Maury | G06F 3/167 |
| 2022/0270618 | A1* | 8/2022 | Zhang | G10L 15/22 |

OTHER PUBLICATIONS

U.S. Appl. No. 16/723,887, Notice of Allowance, dated Feb. 14, 2022, 10 pages.

Bassia et al., "Robust Audio Watermarking in the Time Domain", IEEE Transactions on Multimedia, vol. 3, No. 2, Jun. 27, 2001, pp. 232-241.

Brumm et al., "Acoustic Communication in Noise", Advances in the Study of Behavior, vol. 35, 2005, pp. 151-209.

Chen et al., "You Can Hear But You Cannot Steal: Defending against Voice Impersonation Attacks on Smartphones", 2017 IEEE 37th International Conference on Distributed Computing Systems (ICDCS), Jun. 5-8, 2017, 13 pages.

Application No. EP20215524.8, Extended European Search Report, dated Apr. 21, 2021, 9 pages.

Feng et al., "Continuous Authentication for Voice Assistants", MobiCom '17: Proceedings of the 23rd Annual International Conference on Mobile Computing and Networking,, Oct. 2017, 17 pages.

Swanson et al., "Robust Audio Watermarking Using Perceptual Masking", Signal Processing, vol. 66, No. 3, May 1998, pp. 337-355.

* cited by examiner

ACOUSTIC SIGNATURES FOR VOICE-ENABLED COMPUTER SYSTEMS

CROSS-REFERENCE TO RELATED APPLICATION

This application is a continuation of U.S. application Ser. No. 16/723,887, filed Dec. 20, 2019, the disclosure of which is incorporated herein by reference.

BACKGROUND

This disclosure relates generally to voice-based identity verification in voice-enabled computer systems and in particular to acoustic signatures for voice-enabled computer systems.

Voice-enabled computer systems are becoming increasingly popular. Examples include smart phones with "intelligent" assistants, smart speakers, and other devices that can respond to voice input. Voice-enabled computer systems typically use a microphone to detect user speech and a speaker to play audible responses using a synthetic voice. Some voice-enabled computer systems can process detected speech locally to determine a particular request (or command) from the user, then communicate as appropriate with other devices or computer systems (referred to generally as servers) to process the request and determine a response (which can be an action taken or speech response or both). Other voice-enabled computer systems can forward recorded audio to a "backend" server that processes the speech and determines the request. Still other voice-enabled computer systems use a combination of local (client-based) and backend (server-based) processing to respond to user input.

Voice-enabled computer systems can support a range of user interactions that involve varying degrees of security risk. Some interactions, such as a request for a weather forecast or a request to play music, present little security risk regardless of who makes the request. Other interactions, such as a request to unlock a door or a request to access a bank account, may present a significant security risk if an unauthorized person makes the request. Accordingly, some voice-enabled devices may use voice-based identity verification techniques to confirm that a request is being made by an authorized person prior to responding to the request. Voice-based identity verification can include comparing audio characteristics of a recorded request to known audio characteristics of the authorized person's voice. For instance, the user may speak a pass phrase that can be compared to a recorded version to assess frequency characteristics, rate of speaking, pronunciation of words, and/or other characteristics.

Voice-based identity verification can be susceptible to "replay" attacks, in which an unauthorized person obtains a recording of the authorized person's voice and plays the recording later in an attempt to fool the voice-enabled computer system. If the recording is of sufficient quality, a voice-based identity verification process may be unable to distinguish the recording from live speech by the authorized person. Preventing or detecting replay attacks may therefore be desirable.

SUMMARY

Embodiments disclosed herein relate to acoustic signatures that can be used in connection with a voice-enabled computer system. In some embodiments, an acoustic signature can be a specific noise pattern (or other sound) that is played while the user is speaking and that is mixed in the acoustic channel with the user's speech. The microphone of the voice-enabled computer system can capture, as recorded audio, a mix of the acoustic signature and the user's voice. The voice-enabled computer system can analyze the recorded audio (locally or at a backend server) to verify that the expected acoustic signature is present and/or that no previous acoustic signature is present.

Some embodiments of the invention relate to a method performed by a voice-enabled computer system. A method can comprise obtaining a current nonce and operating a speaker of the voice-enabled computer system to produce a current acoustic signature based on the current nonce. The method can further comprise operating a microphone of the voice-enabled computer system, while producing the current acoustic signature, to record audio that includes the current acoustic signature and a speech input, and validating the recorded audio based at least in part on the current acoustic signature. In the event that the recorded audio is validated, the method can further comprise: processing the recorded audio to extract the speech input; processing the speech input to determine an action to perform; and performing the action.

Some embodiments of the invention relate to a server computer comprising a processor, a memory, and a computer readable medium coupled to the processor. The computer readable medium can have stored therein code executable by the processor to implement a method comprising: generating a nonce; providing the nonce to a voice-enabled client having a speaker and a microphone and capable of generating an acoustic signature based on the nonce; receiving, from the voice-enabled client, an audio recording; validating the audio recording based at least in part on detecting the acoustic signature in the audio recording; and processing user speech in the audio recording only if the audio recording is validated.

Some embodiments of the invention relate to a voice-enabled computer system comprising a processor, a memory, a speaker operable by the processor, a microphone operable by the processor, and a computer readable medium coupled to the processor. The computer readable medium can have stored therein code executable by the processor to implement a method comprising: obtaining a nonce; operating the speaker to produce an acoustic signature based on the nonce; and while producing the acoustic signature, operating the microphone to record an audio recording that includes the acoustic signature and a speech input.

The following detailed description, together with the accompanying drawings, will provide a better understanding of embodiments of the invention.

TERMS

Figure 1:
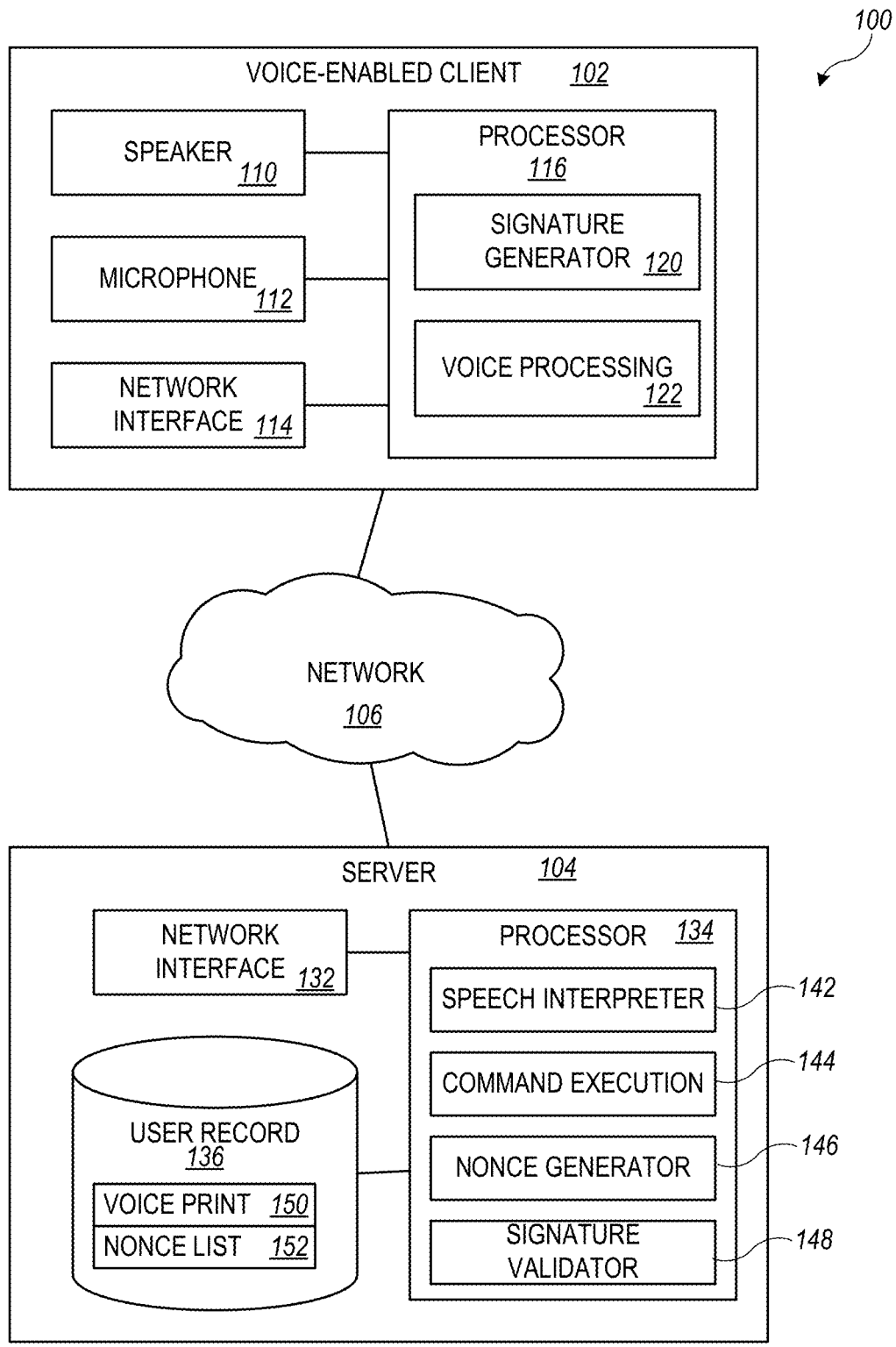
FIG. 1 shows a simplified block diagram of a voice-enabled computer system according to some embodiments.

The following terms may be used herein.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "client" or "client computer" may include a computer system or other electronic device that communicates with a server computer to make requests of the server computer and to receive responses. For example, the client can be a laptop or desktop computer, a mobile phone, a tablet computer, a smart speaker, a smart-home management device, or any other user-operable electronic device.

A "memory" may include suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "communication device" may include any electronic device that may provide communication capabilities including communication over a mobile phone (wireless) network, wireless data network (e.g., 3G, 4G, or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, hand-held specialized readers, wearable devices (e.g., watches), vehicles (e.g., cars), etc. A communication device may comprise any suitable hardware and software for performing such functions, and may also include multiple devices or components (e.g., when a device has remote access to a network by tethering to another device—i.e., using the other device as a relay—both devices taken together may be considered a single communication device). A communication device may store and capture recordings of a user's voice and may store recordings locally and/or forward recordings to another device (e.g., a server computer) for processing. A mobile device may store recordings on a secure memory element.

A "user" may include an individual who operates a voice-enabled computer system by speaking to it. In some embodiments, a user may be associated with one or more personal accounts and/or devices.

A "nonce" may include any number or bit string or the like that is generated and valid for a single transaction. A nonce may be generated using random or pseudorandom processes, numerous examples of which are known in arts such as cryptography.

DETAILED DESCRIPTION

The following description of exemplary embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

Certain embodiments described herein relate to acoustic signatures in connection with a voice-enabled computer system. The acoustic signature can be, for example, a dynamically-generated noise pattern (or other sound) that is played by a speaker of the voice-enabled computer system while the user is speaking and that is mixed in the acoustic channel with the user's speech. The microphone of the voice-enabled computer system can capture, as recorded audio, a mix of the acoustic signature and the user's voice. The voice-enabled computer system can analyze the recorded audio (locally or at a backend server) to verify that the expected acoustic signature is present and/or that no previous acoustic signature is present, and requests can be rejected if the verification analysis fails. In some embodiments, use of acoustic signatures in a voice-based identity verification process can improve reliability, e.g., by providing protection against replay attacks.

FIG. 1 shows a simplified block diagram of a voice-enabled computer system 100 according to some embodiments. System 100 includes a voice-enabled client 102 and a server 104 communicably coupled via a network 106 (e.g., the internet).

Voice-enabled client 102 can be any electronic device that is capable of receiving and responding to spoken-language commands. Examples include smart phones, smart speakers, smart-home controllers, or other devices that implement a voice-response feature. In some instances, voice-enabled client 102 may be a personal device associated with a specific user (such as a smart phone); in other instances, voice-enabled client 102 may be a shared device that is routinely used by multiple users (such as a smart-home controller). Voice-enabled client 102 can include various components such as a speaker 110, a microphone 112, a network interface 114, and a processor 116. Speaker 110 can include any device or component that is capable of converting an input signal (e.g., a digital or analog electronic signal received via a wired or wireless interface) to sound (i.e., pressure waves in a compressible medium such as air). Microphone 112 can include any device or component that is capable of converting sound to an output signal (e.g., a digital or analog electronic signal that can be recorded and/or analyzed). Network interface 114 can include hardware and software components that support communication via network 104. For example, network interface 114 can support wireless communication protocols conforming to standards such as Wi-Fi, LTE, 5G, and so on, and/or wired communication protocols such as Ethernet protocols. Numerous implementations of speakers, microphones, and network interfaces are known in the art, and a detailed description is omitted.

Processor 116 can include one or more programmable logic circuits such as a microprocessor or microcontroller, ASIC, FPGA, or the like. By executing suitable program code, processor 116 can be configured to perform various operations including operations described herein. In some embodiments, processor 116 can have an associated memory or storage subsystem (not shown in FIG. 1) that stores program code to be executed and data that may be produced or consumed in the course of executing program code. In some embodiments, the program code can include code implementing a signature generator module 120 and a voice processing module 122. Signature generator module 120 can generate an acoustic signature to be played by speaker 110; examples are described below. Voice processing module 122 can receive output signals from microphone 112 and perform various processing operations on the signals. Examples of such operations include noise reduction, speech parsing (e.g., identifying words from the audio signal), and so on. In some embodiments, voice processing module 122 can also produce voice response signals to be played by speaker 110. Operations of voice processing module 122 can be implemented, e.g., using conventional techniques.

Server 104 can be any server computer, server farm, cloud-based computing system or the like. Server 104 can include a network interface 132, a processor 134, and user records 136. Similarly to network interface 114, network interface 132 can include hardware and software components that support communication via network 104. Processor 134 can include one or more programmable logic circuits such as a microprocessor or microcontroller, ASIC, FPGA, or the like. By executing suitable program code, processor 134 can be configured to perform various operations including operations described herein. In some embodiments, processor 134 can have an associated memory or storage subsystem (not shown in FIG. 1) that stores program code to be executed and data that may be produced or consumed in the course of executing program code. In some embodiments, the program code can include code implementing a speech interpreter 140, a command execution module 142, a nonce generator 146, and a signature validator 148. Speech interpreter 140 can interpret audio recordings provided from voice-enabled client 102 to identify a user request and determine one or more operations to be performed in response to the request. Command execution module 142 can execute operations responsive to speech interpreter 140 and send results of the operations to voice-enabled client 102. Operations of speech interpreter 140 and command execution module 142 can be implemented, e.g., using conventional techniques. Nonce generator 146 can be used to generate a nonce (e.g., a number or bit string) to be used by signature generator 120 of voice-enabled client 102 in generating an acoustic signature; examples are described below. Signature validator 148 can analyze received audio recordings from voice-enabled client 102 to detect the presence of the acoustic signature; examples are described below. User records 136 can include information pertaining to a user of voice-enabled client 102. For example, user record 136 for a particular user can include a voice print 150, which can include any record of distinctive characteristics of the user's voice that can be used for voice-based identity verification, and a nonce list 152 that can store one or more nonces that have previously been used to generate acoustic signatures and that are no longer considered valid. Other user-specific information related to particular services provided by server 104 (e.g., bank account information or other account information) can also be stored in user records 136.

In operation, voice-enabled client 102 (supported by server 104) can provide a voice-response interface to support user interaction with voice-enabled client 102 and/or other devices to which voice-enabled client 102 may be connected (e.g., via network 106). Thus, for example, a user can speak a request such as "what is today's weather forecast?" or "what is my bank balance?" Microphone 112 can pick up the sound and provide a corresponding electronic signal to voice processing module 122. Voice processing module 122 can perform signal processing, for example, to determine that the request should be processed by server 106. Accordingly, the recorded electronic signal can be sent to server 106.

Server 106 can process the recorded electronic signal using speech interpreter 142 to extract a request and can invoke command execution module 144 to perform responsive operations (e.g., retrieving a weather forecast or a bank balance). Command execution module 144 can return a response to voice-enabled client 102, e.g., as an audio file to be played using speaker 110 or as data to be converted to audio by voice processing module 122 and played using speaker 110.

In some (or all) instances, server 104 (or voice-enabled client 102) may verify the user's identity using voice-based identity verification techniques. For example, server 104 can store voice print 150. When voice-based identity verification is desired, voice-enabled client 102 can prompt the user to provide an input for verification. For instance, the user can be prompted to speak a pass phrase, which is sent to server 104. Server 104 can compare the pass phrase to stored voice print 150 and confirm the user's identity based on the results of the comparison.

In accordance with some embodiments described herein, voice-based identity verification or other operations of voice-enabled computer system 100 can incorporate the use of an acoustic signature. As used herein, an "acoustic signature" can include a pattern of sound that is intentionally played into the environment where a user is speaking so that a microphone that picks up the user's voice can also pick up the acoustic signature. The acoustic signature can be dynamic, in the sense that different acoustic signatures are generated for different recording events. In some embodiments, the acoustic signature can be designed such that it is difficult or impossible for a party that does not have knowledge of the specific pattern of sound to filter out the acoustic signature from a recording that contains a mix of the user's speech and the acoustic signature without also rendering the user's speech unusable for voice-based identity verification, making it difficult or impossible to use such a recording in a replay attack. For example, the acoustic signature can include frequencies within the frequency range of a human voice, and the acoustic signature can be time-varying (in frequency and/or volume) in an unpredictable way. In some embodiments, a device such as server 104 (or client 102) that has information defining the acoustic signature that was played during a particular recording event can use the acoustic signature to confirm that the user is present. Additionally or instead, a device such as server 104 (or client 102) can also detect replay attacks by detecting an "old"

acoustic signature in a recording of the user's speech. Specific examples of generating and validating acoustic signatures are described below.

It will be appreciated that voice-enabled computer system 100 is illustrative and that variations and modifications are possible. For example, voice-enabled client 102 can have other components not shown in FIG. 1, such as a display, touch screen, keypad, or other visual or tactile (or other) user interface components. Voice-enabled client 102 can also be implemented using multiple discrete devices. For example, speaker 110 and/or microphone 112 can be provided in earbuds, earphones, or headphones connected (using a wired or wireless connection) to a larger device such as a smart phone. It should be noted that speakers located in earbuds, earphones, or headphones may not be optimal for generating acoustic signatures because the sound from such speakers might not be picked up by a microphone. Where this is the case, a speaker within the larger device to which the earbuds, earphones, or headphones are connected can be used instead. The division of operations between voice-enabled client 102 and server 104 can also be modified. For example, some voice-enabled clients may simply provide recorded speech to a server for interpretation, while other voice-enabled clients may process recorded speech locally to determine the user request, then relay the request to an appropriate server as needed. In some instances, a voice-enabled client may be able to interpret and respond to some requests locally, without involving a server. Thus, in various embodiments, voice-based identity verification may be performed locally on a voice-enabled client or remotely at a server (or both). It should be understood that acoustic signatures described herein may be used in any instance where voice-based identity verification is being performed and by any device (including a server and/or a client) that performs voice-based identity verification. As described below, the acoustic signature can be specified by the same server or client that validates the acoustic signature.

Figure 2:
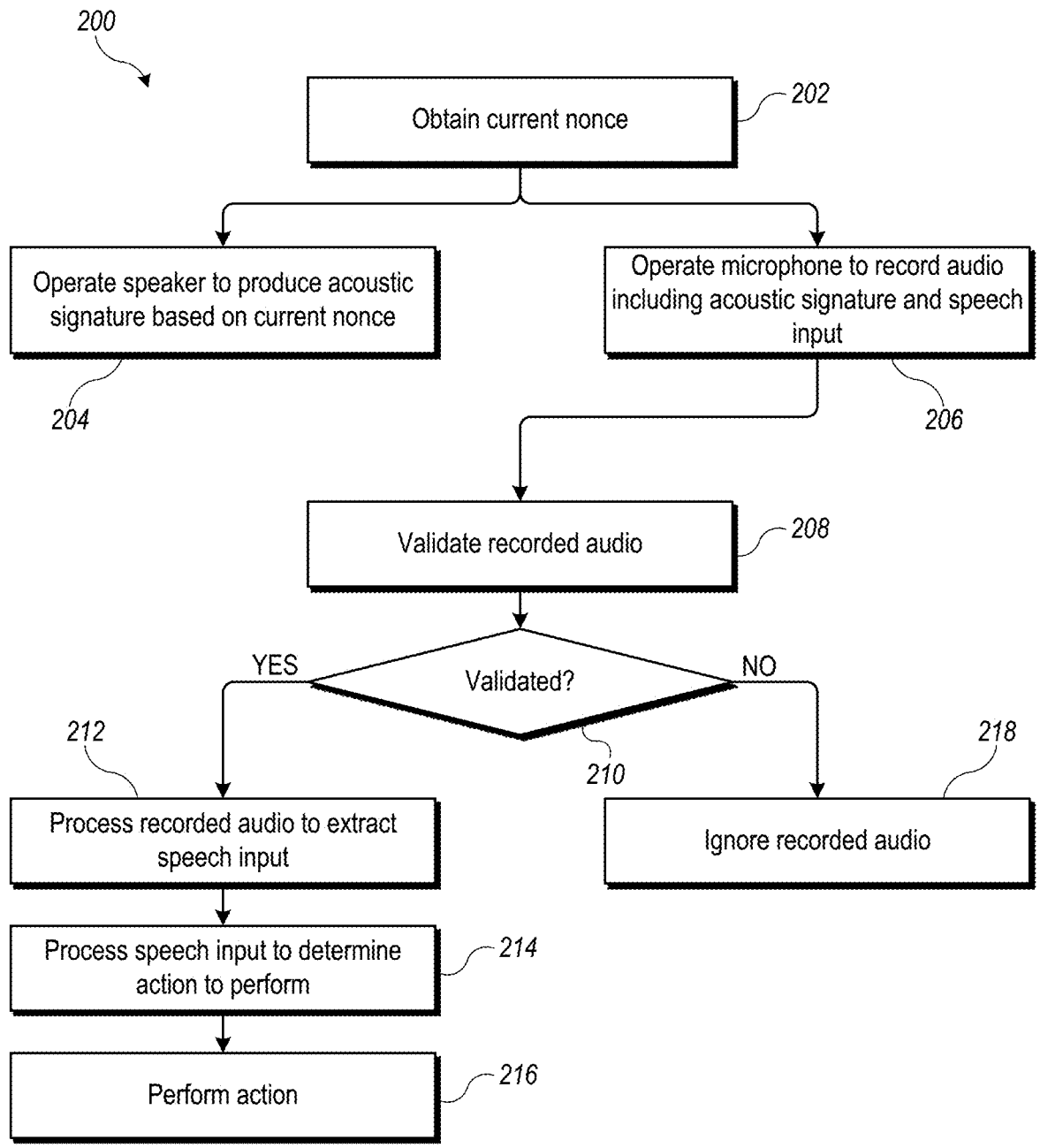
FIG. 2 shows a flow diagram of a process for generating and validating acoustic signatures that may be used in some embodiments.

FIG. 2 shows a flow diagram of a process 200 for generating and validating acoustic signatures that may be used in some embodiments. Process 200 can be implemented in voice-enabled computer system 100 of FIG. 1 or in any other voice-enabled computer system. Process 200 can begin at any point where a voice-enabled system determines that an acoustic signature is useful, such as when a user is being prompted to speak a pass phrase or provide other voice input that may be used to verify the user's identity.

At block 202, a voice-enabled device in the voice-enabled computer system (e.g., voice-enabled client 102) can obtain a current nonce. In some embodiments, the nonce can be obtained from nonce generator 146 of server 104. Depending on implementation, client 102 may request a nonce from server 104, or server 104 may determine, e.g., based on a particular request from client 102, that an acoustic signature should be used and may provide the nonce to client 102. In other embodiments, the nonce can be generated locally by the voice-enabled client; this can be useful, e.g., where the voice-enabled client performs voice-based identity verification locally. The nonce can be, for example, a randomly-generated number or other token or data that is usable to determine a sequence of sounds to be generated. Specific examples are described below.

At block 204, the voice-enabled device can operate a speaker (e.g., speaker 110) to produce an acoustic signature (e.g., a sequence of sounds) based on the current nonce. Concurrently, at block 206, the voice-enabled device can operate a microphone (e.g., microphone 112) to record audio. The acoustic signature and the speech input from the user can overlap in time and can be recorded as a single audio recording that includes a mix of the acoustic signature and speech input from the user. Recording of audio at bock 206 can include storing a digital or analog representation of the audio signal in any storage medium, including short-term storage such as a cache or buffer, for a long enough period of time to support validation and other audio-processing operations associated with the voice-enabled computer system.

At block 208, the recorded audio can be validated based at least in part on presence of the acoustic signature. In some embodiments, validation can include analyzing the recorded audio to determine whether the acoustic signature produced at block 204 is present in the recorded audio. Validation can also include other operations, such as analyzing the recorded audio to determine whether a different acoustic signature from a previous iteration of process 200 is present. Detection of an acoustic signature from a previous iteration of process 200 can be indicative of a replay attack using audio that was recorded by an interloper during the previous iteration and can be a basis for invalidating the recorded audio. Specific examples of validation processes are described below. Depending on implementation, validation can be performed by a server that responds to requests or locally on the voice-enabled client that recorded the audio at block 206. In some embodiments, validation at block 208 can also include other operations such as extracting the user's voice from the recorded audio and comparing the extracted voice to a stored voice print of the user.

At block 210, process 200 can determine whether the recorded audio is valid or invalid, based on the results of validation at block 208. If the recorded audio is valid, process 200 can proceed with acting on the speech input. For example, at block 212, process 200 can process the recorded audio to extract the speech input; at block 214, process 200 can process the speech input to determine an action to perform; and at block 216, process 200 can perform the action. If, at block 210, the recorded audio is not valid, then at block 218 process 200 can ignore the recorded audio. In some embodiments, ignoring the recorded audio can include notifying the user that the input was rejected. If desired, the user may be prompted to try again, or further activity by the user may be restricted (e.g., if a replay attack is suspected).

It will be appreciated that process 200 is illustrative and that variations or modifications are possible. For example, operations described with reference to a single block can be performed at different times, operations described with reference to different blocks can be combined into a single operation, order of operations can be varied, and some operations may be omitted entirely. As long as the playing of the acoustic signature overlaps in time with the recording of the user's speech, the acoustic signature can be used during a validation operation as described herein. In some embodiments, process 200 can be used whenever the user provides voice input to a voice-enabled computer system. For instance, some voice-enabled computer systems operate by listening for a specific activation phrase (such as "Hey Assistant") and begin to process other voice-based input in response to detecting the activation phrase. Accordingly, a voice-enabled computer system that has an activation phrase can obtain a nonce and begin to play the acoustic signature in response to detecting the activation phrase. In other embodiments, use of process 200 can be more selective. For example, the user may interact with the voice-enabled computer system without an acoustic signature until the user requests an action that involves sensitive information, at which point, process 200 can be invoked. Examples of selective invocation of process 200 are described below.

Figure 3:
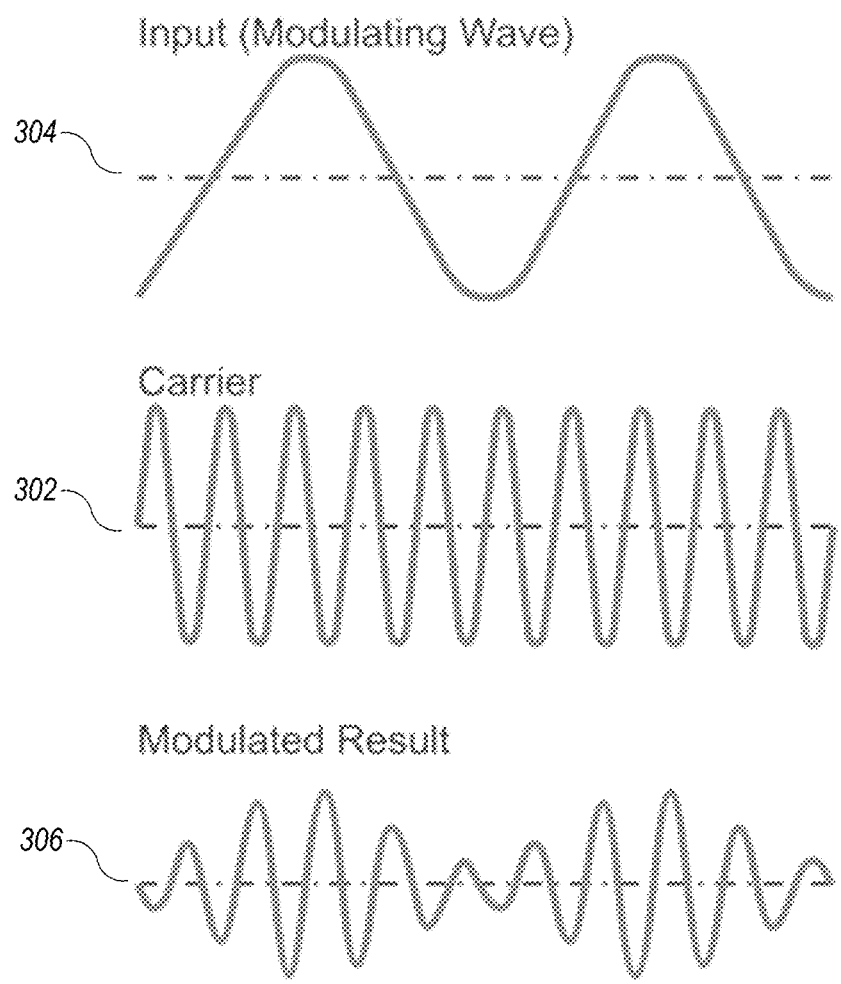
FIG. 3 shows an example of amplitude modulation that may be used in some embodiments.
Figure 4:
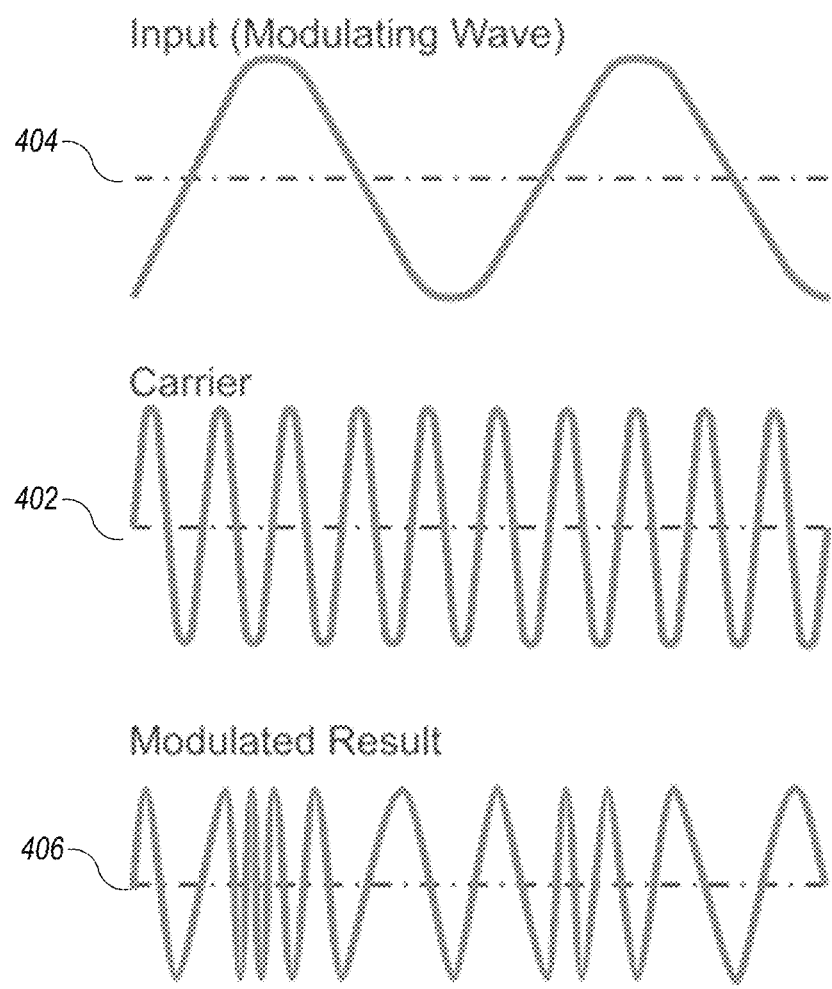
FIG. 4 shows an example of frequency modulation that may be used in some embodiments.
Figure 5:
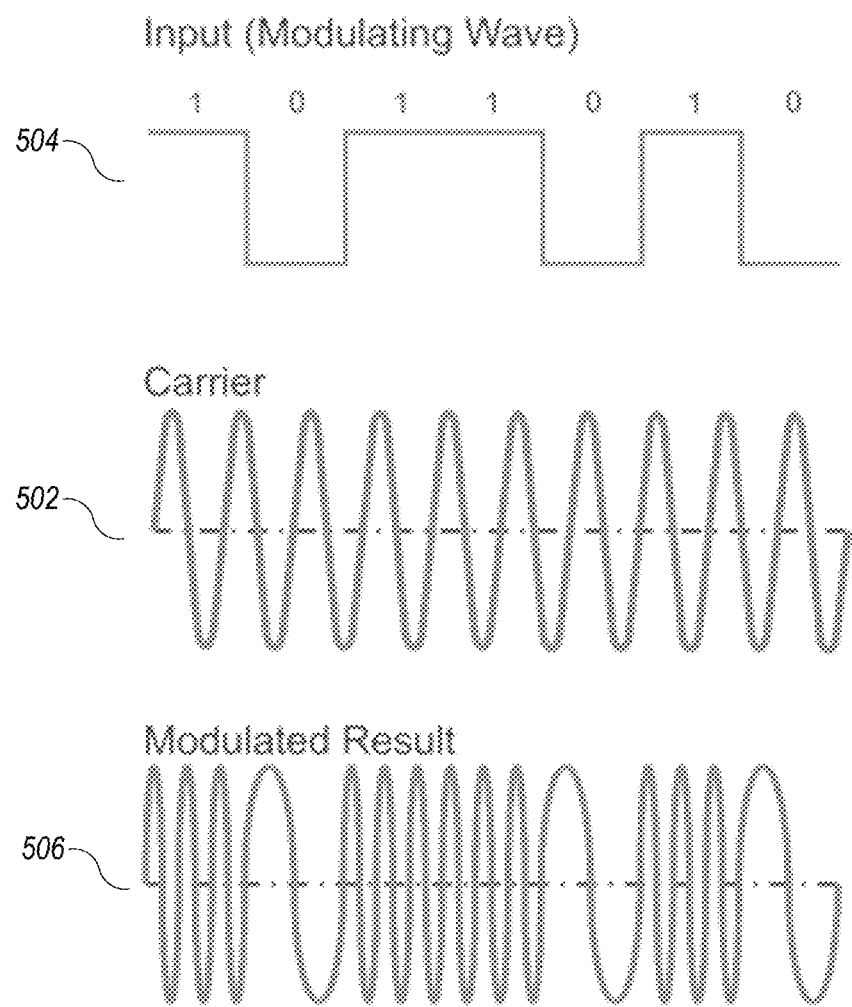
FIG. 5 shows an example of digital modulation that may be used in some embodiments.

In some embodiments, acoustic signatures can be produced as modulated tones within the range of human-voice frequencies. FIGS. 3-5 show examples of modulation of a base (or carrier) frequency that can be used in some embodiments.

FIG. 3 shows an example of amplitude modulation. A carrier wave 302 of a given frequency $f_c$ is modulated in amplitude according to an input wave 304, producing a modulated wave 306. When played by a speaker, modulated wave 306 can produce sound of a constant pitch (frequency) whose loudness (amplitude) varies with time.

FIG. 4 shows an example of frequency modulation. A carrier wave 402 of a given frequency $f_c$ is modulated in frequency according to an input wave 404, producing a modulated wave 406. In this example, the deviation from the carrier frequency is a function of the amplitude of input wave 404. When played by a speaker, modulated wave 406 can produce a sound of constant loudness (amplitude) but variable pitch (frequency).

FIG. 5 shows an example of digital modulation. A carrier wave 502 of a given frequency $f_c$ is modulated digitally according to an input binary signal 504, producing a modulated wave 506. In this example, when the binary signal is in the "1" state, the frequency is increased to higher than the carrier frequency, and when the binary signal is in the "0" state, the frequency is decreased to lower than the carrier frequency. When played by a speaker, modulated wave 506 can produce a sound of constant loudness (amplitude) but variable pitch (frequency).

The modulation schemes of FIGS. 3, 4, and 5 are illustrative, and other modulation schemes may be used. In some embodiments, the choice of modulation scheme can be an element of the acoustic signature, and multiple modulation schemes can be combined. It is contemplated that the acoustic signature may be audible to the user and may sound like noise.

In some embodiments, a nonce is used to define the acoustic signature for a particular instance of process 200. The nonce can be a bit string (or number) of arbitrary length that is generated using a process such that knowledge of previous nonces cannot be used to predict a future nonce. Random processes, pseudorandom processes, or any other processes having a sufficient degree of unpredictability can be used. Generation of the nonce can be performed by the server (or client) that will validate the acoustic signature. (For instance, generation of the nonce can be performed by nonce generator 146 of server 104 in system 100).

To generate an acoustic signature, the nonce can be "decoded" to define a corresponding sound wave. Decoding of the nonce can be performed by the device that generates the acoustic signature (e.g., by signature generator 120 of voice-enabled client 102 in system 100). The decoding scheme can be varied, as long as the same decoding scheme is used for generating the acoustic signature and for subsequent validation of the acoustic signature.

Figure 6:
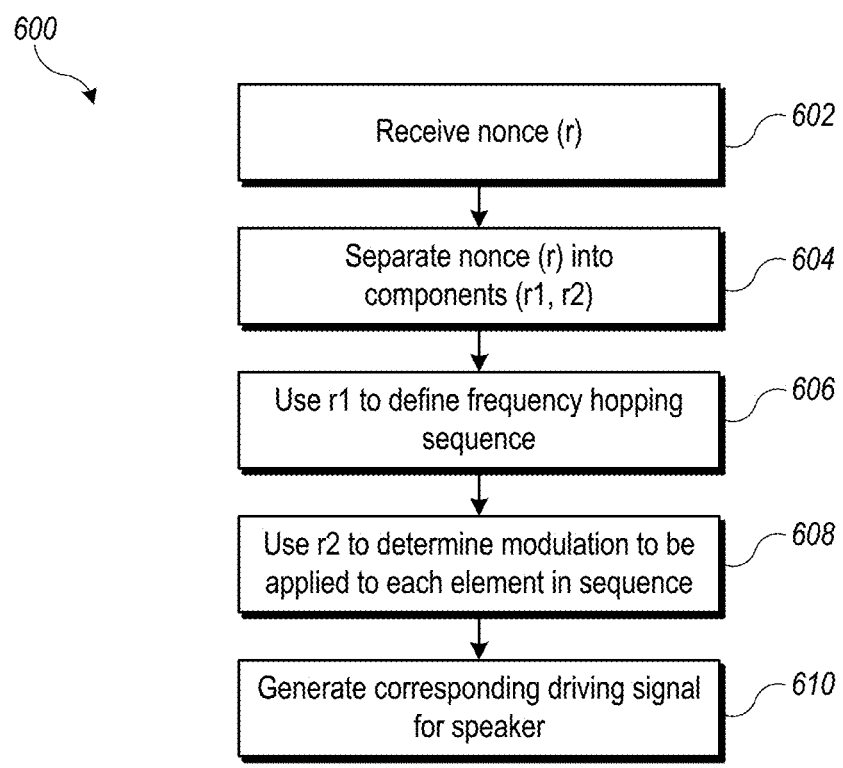
FIG. 6 shows a flow diagram of a process for decoding a nonce that can be used in some embodiments.

In some embodiments, the decoding scheme can be a frequency-hopping scheme with variable modulation. FIG. 6 shows a flow diagram of a process 600 for decoding a nonce that can be used in some embodiments. Process 600 can be implemented, e.g., in signature generator 120 of voice-enabled client 102 of FIG. 1 or in any other voice-enabled device.

At block 602, process 600 can receive a nonce (r), e.g., from server 104 or another nonce generator. At block 604, process 600 can separate the nonce into two components ($r_1$ and $r_2$). For example, if the nonce is a string of N bits for some integer N, the first component $r_1$ can be defined as the first N/2 bits while the second component $r_2$ is defined as the second N/2 bits. Other separation techniques can be used, and the lengths of the two components need not be equal. At block 606, process 600 can use the first component $r_1$ to define a frequency-hopping sequence. The frequency hopping sequence can be a sequence of carrier frequencies that are used during successive time intervals. At block 608, process 600 can use the second component $r_2$ to define a modulation input to be applied to the carrier frequency during each time interval. In some embodiments, different modulation inputs can be defined for different time intervals. At block 610, process 600 can generate a corresponding driving signal for the speaker. For instance, the driving signal for a first time interval can be generated by modulating the carrier frequency of the first time interval (determined from first component $r_1$) using the modulation input for the first time interval (determined from second component $r_2$), and so on.

Figure 7:
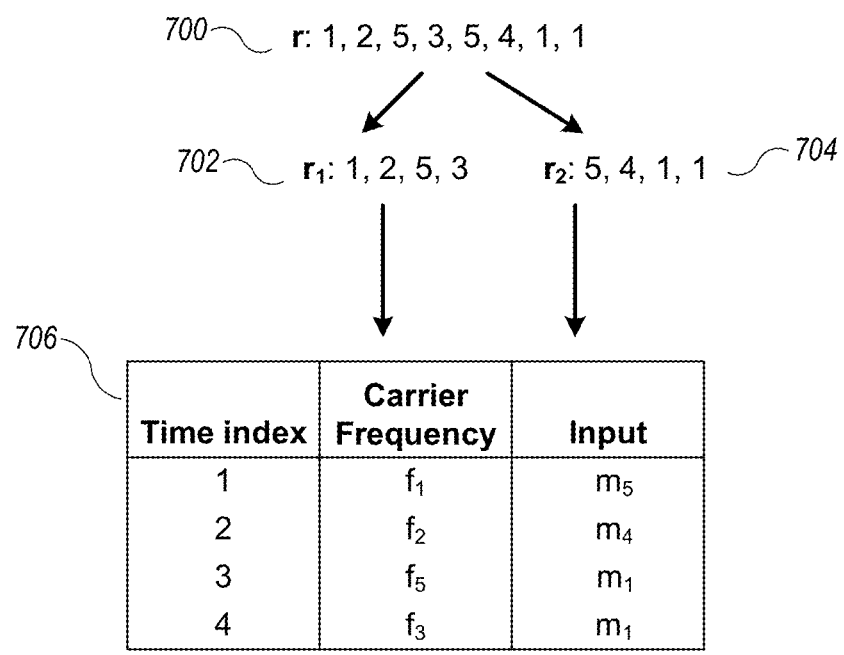
FIG. 7 illustrates a simplified example of decoding a nonce according to some embodiments.

FIG. 7 illustrates a simplified example of decoding a nonce according to an embodiment of process 600. In this example, it is assumed that the frequency hopping sequence includes four time intervals. At each time interval, one of a set of carrier frequencies and one of a set of modulation patterns are assigned based on a received nonce r (700). The nonce r can be interpreted as a set of eight numbers (shown as decimal numbers for convenience). The nonce r can be separated into components $r_1$ and $r_2$ by assigning the first four numbers to first component $r_1$ (702) and the second four numbers to second component $r_2$ (704). Other schemes can be used, such as assigning alternate numbers to alternate components.

An interpretation of components $r_1$ and $r_2$ according to some embodiments is shown in table 706. For purposes of this example, it is assumed that a set of at least five distinct carrier frequencies has been defined and that a set of at least five distinct modulation patterns has also been defined. Each carrier frequency is mapped to an index ($f_1$, $f_2$, etc.), and each modulation pattern is mapped to an index ($m_1$, $m_2$, etc.). For each time interval, an acoustic signature is determined by applying the modulation pattern identified by the corresponding element of $r_2$ to the carrier frequency identified by the number at the corresponding element of $r_1$. As shown in table 706, during a first time interval, the carrier frequency is $f_1$ (because the first element of $r_1$ is 1) and the modulation pattern is $m_5$ (because the first element of $r_2$ is 5). Thus, during the first time interval, the acoustic signature corresponds to carrier frequency $f_1$ modulated according to modulation pattern $m_5$. During a second time interval, the carrier frequency is $f_2$ (because the second element of $r_1$ is 2) and the modulation pattern is $m_4$ (because the second element of $r_2$ is 4). Thus, during the second time interval, the acoustic signature corresponds to carrier frequency $f_2$ modulated according to modulation pattern $m_4$. Similarly, during the third time interval, the acoustic signature corresponds to carrier frequency $f_5$ modulated according to modulation pattern $m_1$, and during the fourth time interval, the acoustic signature corresponds to carrier frequency $f_3$ modulated according to modulation pattern $m_1$.

Figure 8:
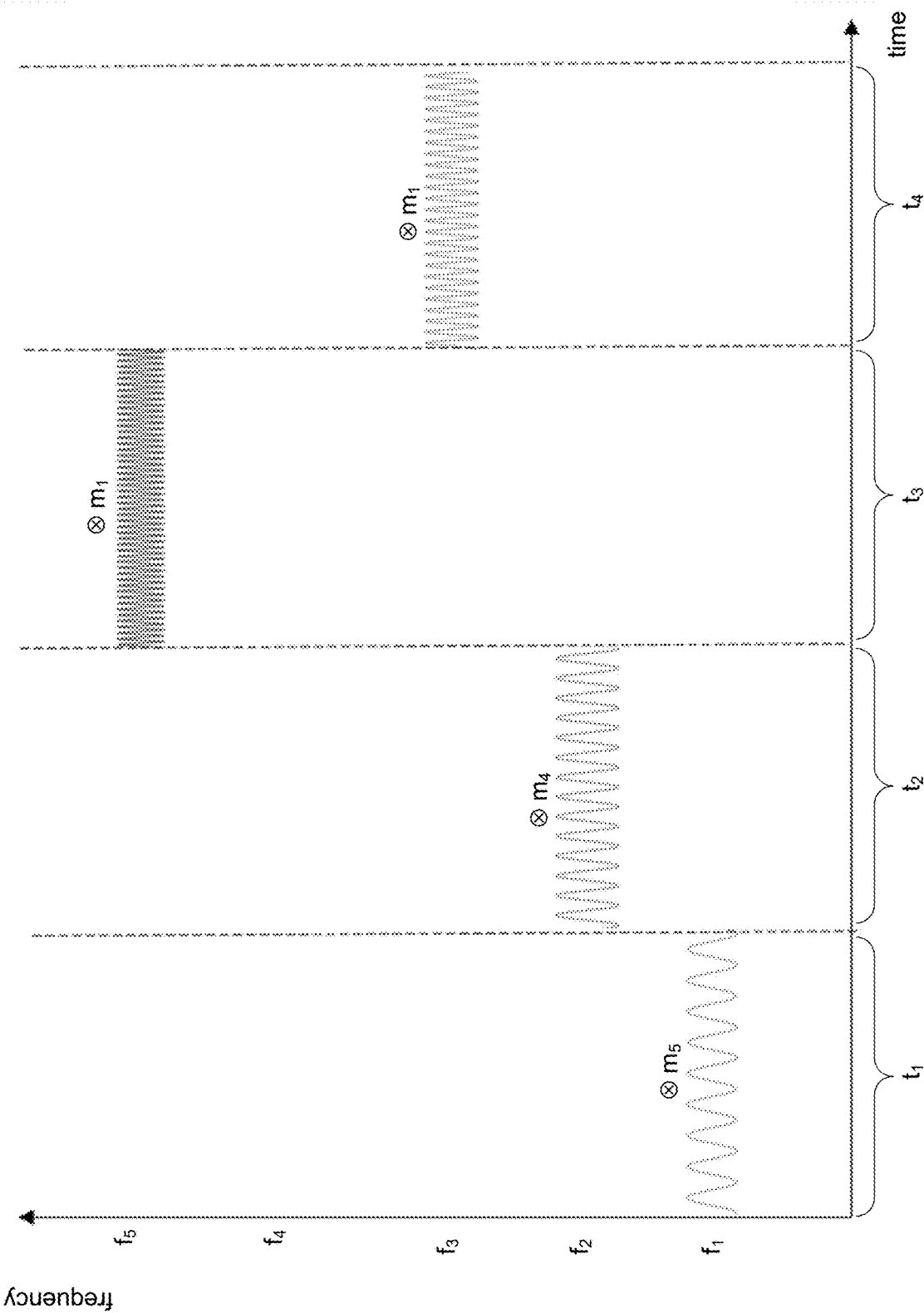
FIG. 8 shows a simplified representation of an acoustic signature that can be produced according to some embodiments.

FIG. 8 shows a simplified graphical representation of an acoustic signature that can be produced according to table 702 in some embodiments. Time is shown on the horizontal axis, and different carrier frequencies are represented on the vertical axis. For each time interval ($t_1$ to $t_4$), the carrier frequency is chosen according to the corresponding element of r1. Time intervals can be of short duration, e.g., 1-10 ms, 10-50 ms, or the like. The carrier frequencies $f_1$ to $f_5$ are different frequencies, and the signal can hop from one frequency to the next. Further, during each time interval, a modulation pattern is applied ($\otimes m_5$, $\otimes m_4$, $\otimes m_1$, $\otimes m_1$) according to the corresponding element of $r_2$. Each modulation pattern can include amplitude modulation, a frequency modulation, a digital modulation, or any other modulation pattern.

It should be understood that FIGS. 6-8 are illustrative of processes and modulation schemes that can be used to generate an acoustic signature based on a nonce. Any combination of carrier frequencies and/or modulation patterns, and any number of carrier frequencies and/or modulation patterns, can be used. In some embodiments, it may be desirable to select carrier frequencies that are within a "vocal range," which can be a range of frequencies associated with the human voice generally or associated with a particular user's voice. Using frequencies within a vocal range can prevent filtering out of the acoustic signature by noise-reduction in the microphone or associated signal processing components. In addition, as described below, the presence of an "old" acoustic signature can be an indication of a replay attack, and using frequencies in a vocal range can make it more difficult for an interloper to filter out an "old" acoustic signature from a recording of the user's voice. The volume of the acoustic signature can be varied as desired, as long as it is loud enough to be picked up by the microphone being used in a particular instance. Where the acoustic signature uses frequencies within the range of human hearing, the signature may be audible, and low volume may be desirable.

Figure 9:
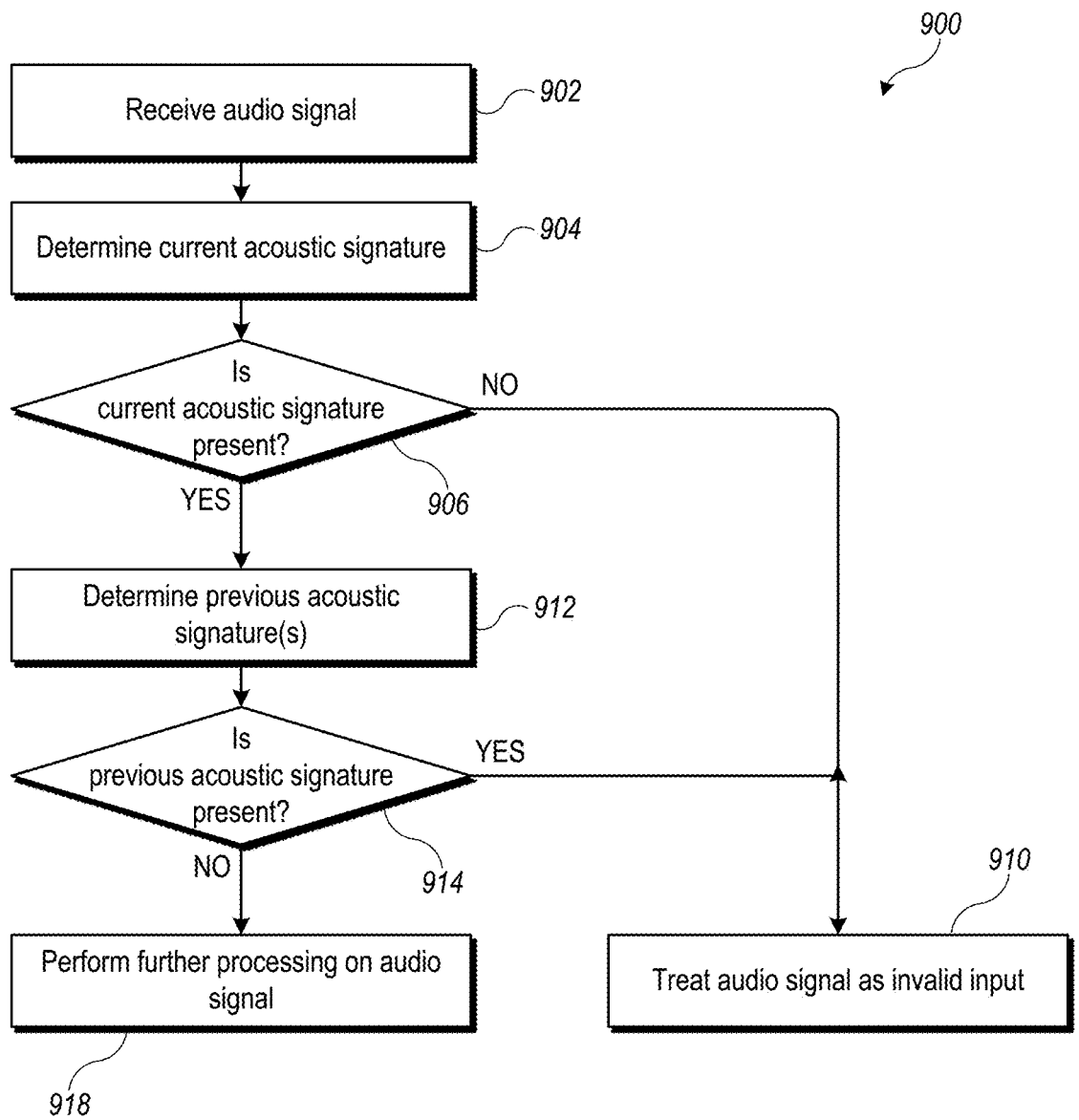
FIG. 9 is a flow diagram of a validation process according to some embodiments.

According to some embodiments, acoustic signatures can be used to validate the integrity of the acoustic channel, e.g., in connection with verifying user identity. FIG. 9 is a flow diagram of a validation process 900 that can be used, e.g., at block 208 of process 200, according to some embodiments. Process 900 can be performed, e.g., by signature validator 148 of server 102 of system 100 or by any other device that performs voice-based identity verification.

Process 900 can begin at block 902 with receiving an audio signal, which can be a digital or analog signal depending on implementation. The audio signal is assumed to include a combination (or mix) of user speech and an acoustic signature; for instance, the audio signal can correspond to the audio recorded at block 206 of process 200. At block 904, process 900 can determine a "current" acoustic signature, (i.e., an acoustic signature that was presumably playing while the audio signal was being recorded). For example, signature validator 148 (or any other device performing process 900) can receive the nonce that was used to generate the current acoustic signature. In some embodiments, signature validator 148 can receive the nonce from nonce generator 146; other techniques for providing the nonce can also be used. Based on the nonce and the applicable decoding scheme for generating an acoustic signature from the nonce (e.g., as described with reference to FIGS. 6-8), process 900 can determine an expected pattern of frequencies and/or amplitudes for the current acoustic signature.

At block 906, process 900 can determine whether the current acoustic signature is present in the received audio signal. Conventional signal-analysis techniques or other techniques can be used to determine whether the received audio signal includes a component corresponding to the current acoustic signature. If the current acoustic signature is not present, then at block 910, process 900 can treat the received audio signal as an invalid input. In various embodiments, treating an audio signal as invalid can include any or all of: ignoring the audio signal, prompting the user to try again (which may include providing a different nonce that generates a different acoustic signature for the next attempt), generating a notice to the user of an invalid access attempt, or other actions as desired.

If, at block 906, the current acoustic signature is present, then at block 912, process 900 can determine one or more "previous" acoustic signatures to be detected. Each previous acoustic signature can be an acoustic signature that would have been generated by the voice-enabled computer system in response to a nonce that was generated in connection with a previous validation process. In some embodiments, server 104 (or other device that executes process 900) can store nonces that have previously been used for a particular user or voice-enabled client, e.g., in nonce list 152 as shown in FIG. 1. Each stored nonce can be used to determine a previous acoustic signature that might be present. In some embodiments, there can be an upper limit on the number or age of stored nonces; however, no particular limit need be imposed, and any number of previous acoustic signatures can be determined at block 912.

At block 914, process 900 can determine whether any previous acoustic signature is present in the received audio signal. For instance, the same signal analysis techniques applied at block 906 can be applied at block 914, using each previous acoustic signature. In this example, presence of a previous acoustic signature is treated as indicating that the user's voice was originally recorded at a time when the previous acoustic signature was the current acoustic signature and is now being played back. Accordingly, if block 914 results in a determination that a previous acoustic signature is present, then at block 910, process 900 can treat the received audio signal as an invalid input, which can help to prevent replay attacks. In some embodiments, process 900 can notify the user (e.g., via a different channel such as email or text messaging) that a suspicious voice input was received and that the user's security may be compromised; the notification can also provide recommendations for remedial action or other information as desired.

If, at block 914, no previous acoustic signature is present (and the current acoustic signature is present, as determined at block 906), process 900 can accept the input and perform further processing on the audio signal at block 918. Any type of processing operation can be supported. For example, if the user input is expected to include a pass phrase, further processing at block at block 918 can include actions such as detecting the pass phrase, comparing the received voice pattern to a stored voice print (e.g., voice print 150 of FIG. 1), and determining whether the user's identity is validated based on the results. Other processing operations may include: other voice-based identity validation operations; parsing the speech input to determine a command to execute or to extract information to be used in executing a command (e.g., an access code, transaction amount, or the like); executing a command using the speech input; and so on. In some embodiments, prior to performing voice-based identity validation or other processing operations, process 900 can filter out the current acoustic signature from the audio signal, e.g., using conventional techniques for removing a known signal component from a mixed audio signal, to obtain a noise-free voice signal. As described above, the acoustic signature may have frequency overlap with the user's voice, which could potentially lead to errors in matching voice patterns (e.g., a frequency spectrum of the user's voice) and/or in speech interpretation. Filtering out the acoustic signature can provide a cleaner voice signal and reduce these types of errors, depending on the particular processing to be performed; however, filtering out the acoustic signature is not required.

It should be noted that process 900 can reliably filter out the current acoustic signature (if desired) because the device that performs process 900 has information defining the current acoustic signature, which makes identifying and filtering out the current acoustic signature from the audio signal straightforward. However, a device or entity that lacks information defining the acoustic signature would not be able to filter it out from the mixed audio signal without distorting the voice component of the signal. Accordingly, if an interloper records the user while an acoustic signature of the kind described herein is being played, it is unlikely that the interloper would be able to filter out the acoustic signature while still retaining a voice recording that can satisfy voice-based identity validation. (It is noted that recording made in the absence of an acoustic signature and replayed later might not be detected by process 900 as a replay attack.)

In various embodiments, an acoustic signature can be generated in any instance where user speech is being captured by a voice-enabled device. The acoustic signature is likely to be audible, however, and it may be desirable to use acoustic signatures selectively. Accordingly, in some embodiments an acoustic signature may be selectively used in connection with verifying the identity of the user. In one example, a user of a voice-enabled device may request sensitive information (such as a bank balance or a health record) or authorize a transaction (such as paying a bill or sending health data to a third party). Prior to fulfilling the request, the voice-enabled device or server that fulfills the request may require the user to perform identity verification, e.g., by speaking a pass phrase or providing some other vocal input for voice-based identity verification. The acoustic signature may be played while the user speaks the pass phrase. If the voice-enabled device or server that uses the pass phrase to verify user identity also has the acoustic signature, validation of the acoustic signature can be used to protect against interlopers using recordings of the user speaking the pass phrase.

Figure 10:
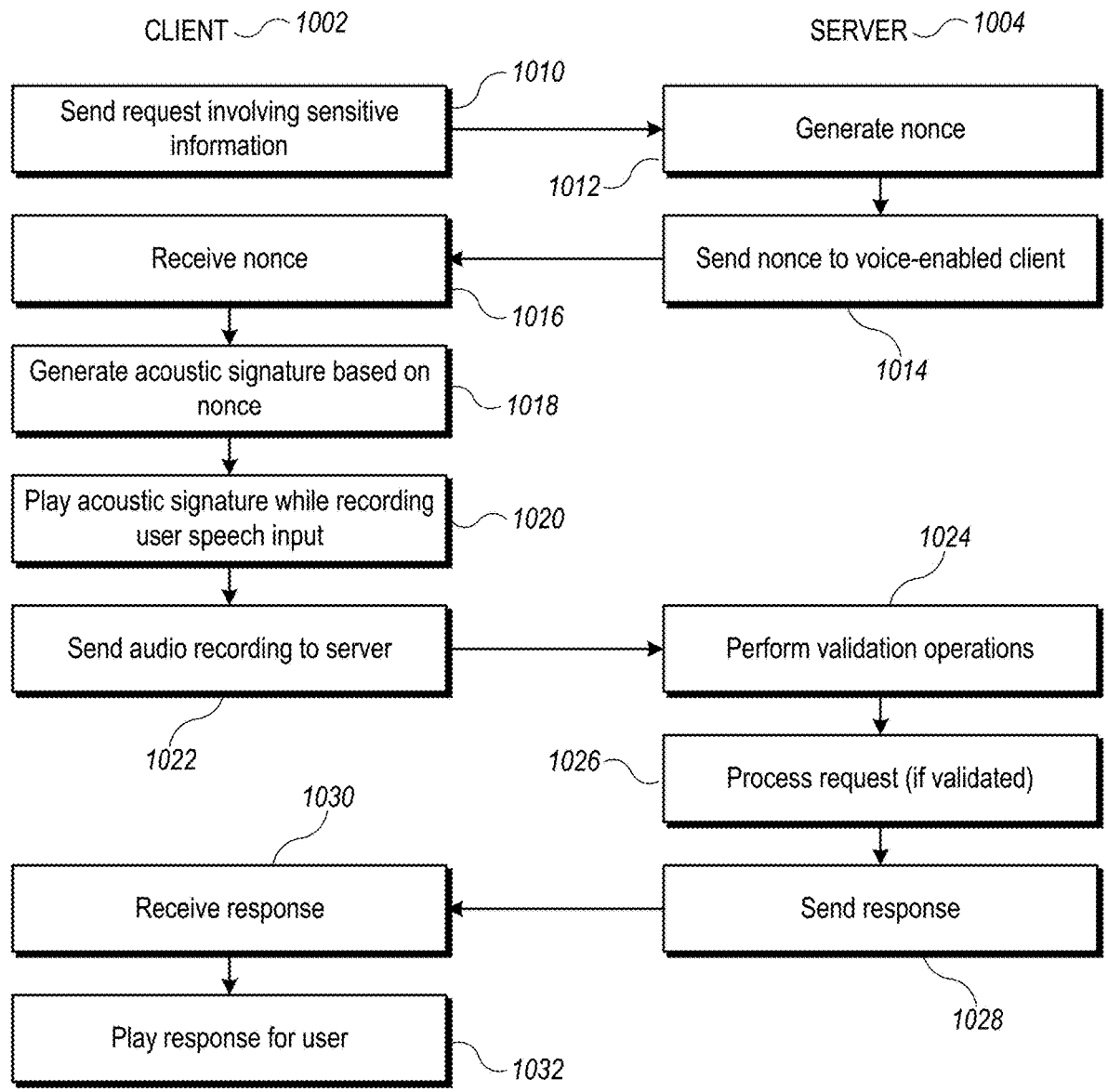
FIG. 10 shows a communication diagram for a client/server interaction according to some embodiments.

FIG. 10 shows a communication diagram for a client/server interaction that incorporates selective use of acoustic signatures according to some embodiments. Client 1002 can be a voice-enabled client such as voice-enabled client 102 of FIG. 1. Server 1004 can be any server that receives and responds to voice requests, such as server 104 of FIG. 1. Communication between client 1002 and server 1004 can take place using a secure channel, such as a virtual private network (VPN), secure HTTP session (e.g., using HTTPS or SSL protocols), or any other channel that sufficiently protects any sensitive information that may be exchanged between client 1002 and server 1004 against third-party eavesdropping. It is assumed that server 1004 has access to sensitive information that should only be provided to an authorized user. It is also assumed that server 1004 uses voice-based identity verification to determine whether a particular request is made by an authorized user.

At block 1010, client 1002 sends a request involving sensitive information to server 1004. In some embodiments, client 1002 can determine that the request involves sensitive information and alert server 1004 to this fact; in other embodiments, server 1004 may make the determination. For example, the request may be a request to check a bank account balance.

At block 1012, responsive to the request involving sensitive information, server 1004 can generate a nonce to be used for acoustic signature generation (e.g., as described above). At block 1014, server 1004 can send the nonce to client 1002. In some embodiments, server 1004 may send the nonce together with a request that client 1002 prompt the user for a pass phrase or other input for a voice-based identity verification process.

At block 1016, client 1002 can receive the nonce. At block 1018, client 1002 can generate an acoustic signature based on the nonce, e.g., according to process 600 described above. At block 1020, client 1002 can play the acoustic signature into the environment (e.g., using speaker 110) while recording sound from the environment (e.g., using microphone 112). At block 1022, client 102 can send the recording to server 1004. The recording is expected to include a mix of the acoustic signature and the user's voice, with the mixing occurring in the audio channel. It should be understood that client 1002 can perform some processing operations on the recording prior to sending it to server 1004, such as verifying that a speech component is present.

At block 1024, server 1004 can perform validation operations on the received recording. Validation operations can include validating the acoustic signature (e.g., using process 900 of FIG. 9) and performing voice-based identity verification after validating the acoustic signature. If the validation operations succeed, server 1004 can process the user's request at block 1026. In some embodiments, the request that is processed was received at block 1010; the recording used for identity verification need not include any specific request. At block 1028, server 1004 can send a response to the request to client 1002. If validation at block 1024 was unsuccessful, the response can be an error response or other response indicating that the request is denied.

At block 1030, client 1002 can receive the response from the server, and at block 1032, client 1002 can play an audible response for the user.

It should be understood that process 1000 can be performed repeatedly. In each instance where a request involving sensitive information is received, server 1004 can generate a new nonce (e.g., using a random process) so that different transactions use different acoustic signatures. Previous nonces can be stored, e.g., as described above, and validation operations at block 1024 can include detecting the presence of an acoustic signature based on a previous nonce (e.g., as described above with reference to process 900), which may indicate a replay attack.

It should also be understood that the division of activities between client and server shown in FIG. 10 is illustrative and may be modified. For instance, voice-processing activity can be performed partly by the client and partly by the server. The system component that performs validation of the acoustic signature can be the same component (or under common control with the component) that generates the nonce defining the acoustic signature, so that the system component that performs validation of the acoustic signature does not have to rely on an independent device to accurately report what acoustic signature was used.

While the foregoing description makes reference to specific embodiments, those skilled in the art will appreciate that the description is not exhaustive of all embodiments. Many variations and modifications are possible. For example, the acoustic signature can include any number of frequency components and modulation schemes. Frequency components can be selected according to general characteristics of the human voice or according to characteristics of a particular user's voice. For example, where acoustic signatures are used in connection with voice-based identity verification, the frequency spectrum of the authorized user's voice may be known, and the acoustic signature can include frequency components within the frequency spectrum of the authorized user's voice, which can make it more difficult for an interloper to filter out the acoustic signature from a recording.

Processes for determining an acoustic signature based on a nonce can also be varied. As in the example above, the nonce can be used to determine frequency and/or modulation patterns for the acoustic signature. The total duration of the acoustic signature can be as long or short as desired. In some embodiments, the acoustic signature is long enough that it can overlap the entirety of the expected speech input. In other embodiments, the acoustic signature can be shorter than the expected speech input and may be played in a loop or in one or more bursts while the user is speaking.

As noted above, use of acoustic signatures can be selectively triggered based on a particular user request. The set of requests that triggers use of acoustic signatures can depend on the particular capabilities of a given voice-enabled client and/or on the requirements of a server that handles voice-based requests. Some voice-enabled computer systems may operate on a transactional model in which the user initiates a request and multiple back-and-forth exchanges with the voice-enabled device may occur while performing the request. Acoustic signatures can be used for any or all of the back-and-forth exchanges in a transaction, depending on the level of security desired. In some embodiments, the acoustic signature can be played while the user speaks a pass phrase. Alternatively, the passphrase can be recorded without playing the acoustic signature, and the acoustic signature can be applied during one or more other exchanges during the transaction.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A method performed by a voice-enabled computer system, the method comprising:
obtaining a current nonce;

operating a speaker of the voice-enabled computer system to produce a current acoustic signature comprising a noise pattern that is dynamically generated based on the current nonce;

while producing the current acoustic signature, operating a microphone of the voice-enabled computer system to record audio that includes the current acoustic signature and a speech input that overlaps in time with the current acoustic signature; and validating the recorded audio based at least in part on the current acoustic signature; and in the event that the recorded audio is validated:
processing the recorded audio to extract the speech input;
processing the speech input to determine an action to perform; and
performing the action.

2. The method of claim 1, wherein validating the recorded audio includes:
determining whether the recorded audio includes the current acoustic signature; and
determining whether the recorded audio includes a different acoustic signature based on a previous nonce, wherein the recorded audio is validated in an event that the recorded audio includes the current acoustic signature and does not include the different acoustic signature.

3. The method of claim 1 wherein operating the speaker of the voice-enabled computer system to produce the current acoustic signature based on the current nonce includes:
defining a frequency-hopping pattern for the current acoustic signature based on a first portion of the current nonce; and
generating sound at the speaker based at least in part on the frequency-hopping pattern.

4. The method of claim 3 wherein the frequency-hopping pattern includes frequencies in a range that overlaps a vocal range of an authorized user.

5. The method of claim 1 further comprising:
prompting a user to speak such that the user speaks while the current acoustic signature is being produced.

6. The method of claim 1 wherein the speech input includes a pass phrase and processing the speech input includes performing voice-based identity verification on the speech input.

7. The method of claim 1 wherein processing the recorded audio includes using the current nonce to filter out the current acoustic signature from the recorded audio.

8. A server computer comprising:
a processor;
a memory; and
a non-transitory computer readable medium coupled to the processor, the non-transitory computer readable medium having stored therein code executable by the processor to implement a method comprising:
generating a nonce;
providing the nonce to a voice-enabled client having a speaker and a microphone and capable of generating an acoustic signature based on the nonce, wherein the acoustic signature comprises a dynamically-generated noise pattern that is generated based on the nonce;
receiving, from the voice-enabled client, an audio recording that includes the acoustic signature and a speech input that overlaps in time with the acoustic signature;
validating the audio recording based at least in part on detecting the acoustic signature in the audio recording; and
processing the speech input of the audio recording only if the audio recording is validated.

9. The server computer of claim 8 wherein the method further comprises adding the nonce to a list of previous nonces after validating the audio recording.

10. The server computer of claim 9 wherein validating the audio recording further includes:
determining, based on the list of previous nonces, whether an old acoustic signature is present in the audio recording,
wherein the audio recording is not validated if an old acoustic signature is present.

11. The server computer of claim 8 wherein processing the speech input of the audio recording includes filtering out the acoustic signature.

12. The server computer of claim 11 wherein processing the speech input of the audio recording includes performing a voice-based identity verification after filtering out the acoustic signature.

13. The server computer of claim 8 wherein providing the nonce to the voice-enabled client is performed in response to a request from the voice-enabled client that involves sensitive information.

14. A voice-enabled computer system comprising:
a processor;
a memory;
a speaker operable by the processor;
a microphone operable by the processor; and
a non-transitory computer readable medium coupled to the processor, the non-transitory computer readable medium having stored therein code executable by the processor to implement a method comprising:
obtaining a nonce;
operating the speaker to produce an acoustic signature comprising a noise pattern that is dynamically generated based on the nonce; and
while producing the acoustic signature, operating the microphone to record an audio recording that includes the acoustic signature and a speech input that overlaps in time with the acoustic signature.

15. The voice-enabled computer system of claim 14 wherein the method further comprises:
validating the audio recording based at least in part on detecting the acoustic signature; and
processing the speech input only in the event that the audio recording is validated.

16. The voice-enabled computer system of claim 14 wherein the nonce is obtained from a server computer and the method further comprises:
sending the audio recording to the server computer for processing;
receiving a response from the server computer; and
providing the response to a user.

17. The voice-enabled computer system of claim 14 wherein operating the speaker to produce the acoustic signature based on the nonce includes:
using the nonce to define a modulation sequence for the acoustic signature; and
generating sound at the speaker based at least in part on the modulation sequence.

18. The voice-enabled computer system of claim 14 wherein the acoustic signature includes frequencies in a range that overlaps a vocal range of a human voice.

19. The voice-enabled computer system of claim 14 wherein obtaining the nonce and operating the speaker to produce the acoustic signature are performed in response to receiving a user request that entails voice-based identity verification.

20. The voice-enabled computer system of claim 14 wherein the method further comprises:
- detecting a speech input corresponding to an activation phrase for the voice-enabled computer system,
- wherein obtaining the nonce and operating the speaker are performed in response to detecting the speech input corresponding to the activation phrase.

* * * * *